(12) United States Patent
Song

(10) Patent No.: US 7,077,452 B2
(45) Date of Patent: Jul. 18, 2006

(54) ATTACHMENT OF A PANEL TO A SOFT INSTRUMENT PANEL OF AN AUTOMOTIVE VEHICLE

(75) Inventor: Andi J Song, Ypsilanti, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 10/987,470

(22) Filed: Nov. 12, 2004

(65) Prior Publication Data

US 2006/0103162 A1   May 18, 2006

(51) Int. Cl.
B62D 25/14 (2006.01)
(52) U.S. Cl. .......................................... 296/70; 180/90
(58) Field of Classification Search ................. 296/70; 180/90; 248/27.3
See application file for complete search history.

(56) References Cited

U.S. PATENT DOCUMENTS 6,854,783 B1 * 2/2005 Teranishi et al. ............. 296/70

2004/0183330 A1 * 9/2004 Ruegenberg et al. ......... 296/70

FOREIGN PATENT DOCUMENTS

JP   2003-511594   3/2003

* cited by examiner

Primary Examiner—Dennis H. Pedder
(74) Attorney, Agent, or Firm—Gifford, Krass, Croh, Sprinkle, Anderson & Citkowski, P.C.

(57) ABSTRACT

An instrument panel assembly for an automotive vehicle is provided, which includes a soft instrument panel having an outer surface, an opening formed in the outer surface, and an abutment surface adjacent the opening and spaced apart from the outer surface. The instrument panel assembly also includes a panel having opposite outer and inner panel surfaces, and at least one rib extending from the inner surface for engaging the abutment surface during assembly of the panel and the instrument panel, thereby locating the panel in an insertion direction relative to the instrument panel, wherein the outer panel surface is maintained generally flush with the outer surface of the instrument panel.

15 Claims, 3 Drawing Sheets

ATTACHMENT OF A PANEL TO A SOFT INSTRUMENT PANEL OF AN AUTOMOTIVE VEHICLE

BACKGROUND OF THE INVENTION

1. Field of the Invention

The invention relates to the attachment of a panel to a soft instrument panel of an automotive vehicle. More particularly, the invention relates to a dual lock shape and step configuration that allows attachment of the panel to the soft instrument panel, such that the outer surfaces thereof are generally flush.

2. Description of the Related Art

It is known to provide a panel for covering an opening defined in a soft instrument panel of an automotive vehicle. Typically, a panel is provided that is adapted for attachment to the instrument panel for covering the opening. A flexible, barbed tab is typically formed in the panel for engaging an abutment edge of the instrument panel, thereby locking the panel relative to the instrument panel in one direction, i.e. a removal direction. An example of such an arrangement is disclosed in Japanese Patent Publication 2002-362192.

It remains desirable to lock the panel relative to the instrument panel in both the removal direction and in an opposite insertion direction. It further remains desirable to control the location of the panel relative to the instrument panel, such that the outer surfaces thereof remain generally flush.

SUMMARY OF THE INVENTION

According to one aspect of the invention, a panel is adapted for attachment to a soft instrument panel of an automotive vehicle, wherein the soft instrument panel includes an outer surface, an opening formed in the outer surface, an inner wall defining a perimeter of the opening, an abutment surface formed in the inner wall spaced apart from the outer surface, and a step extending inwardly from the inner wall, wherein the panel substantially conceals the opening during attachment to the soft instrument panel. The panel includes: an outer panel surface; an inner panel surface opposite the outer panel surface; at least one rib extending from the inner panel surface for engagement with the abutment surface during attachment of the panel thereto, thereby locating the panel in an insertion direction relative to the instrument panel, wherein the outer panel surface is maintained generally flush with the outer surface of the instrument panel; and a tab portion extending from the inner panel surface. The tab portion defines opposing first and second engaging surfaces that are spaced apart for receiving the step therebetween, thereby defining a dual locking condition, wherein the panel is locked in the both said insertion direction and an opposite removal direction, thereby maintaining the outer panel surface flush with the outer surface of the instrument panel.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
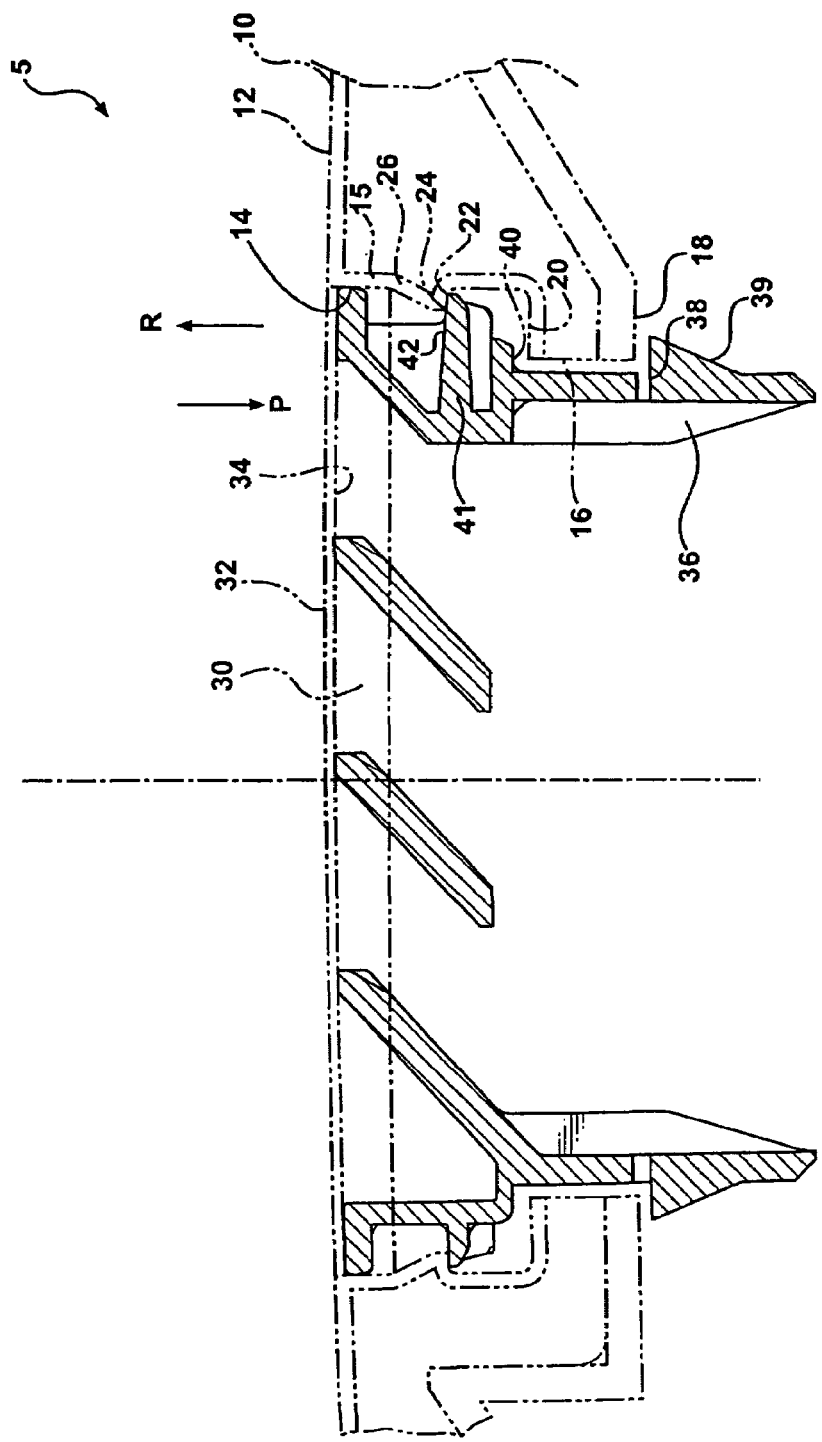
FIG. 1 is a cross sectional view of an instrument panel and a panel according to the invention.
Figure 2:
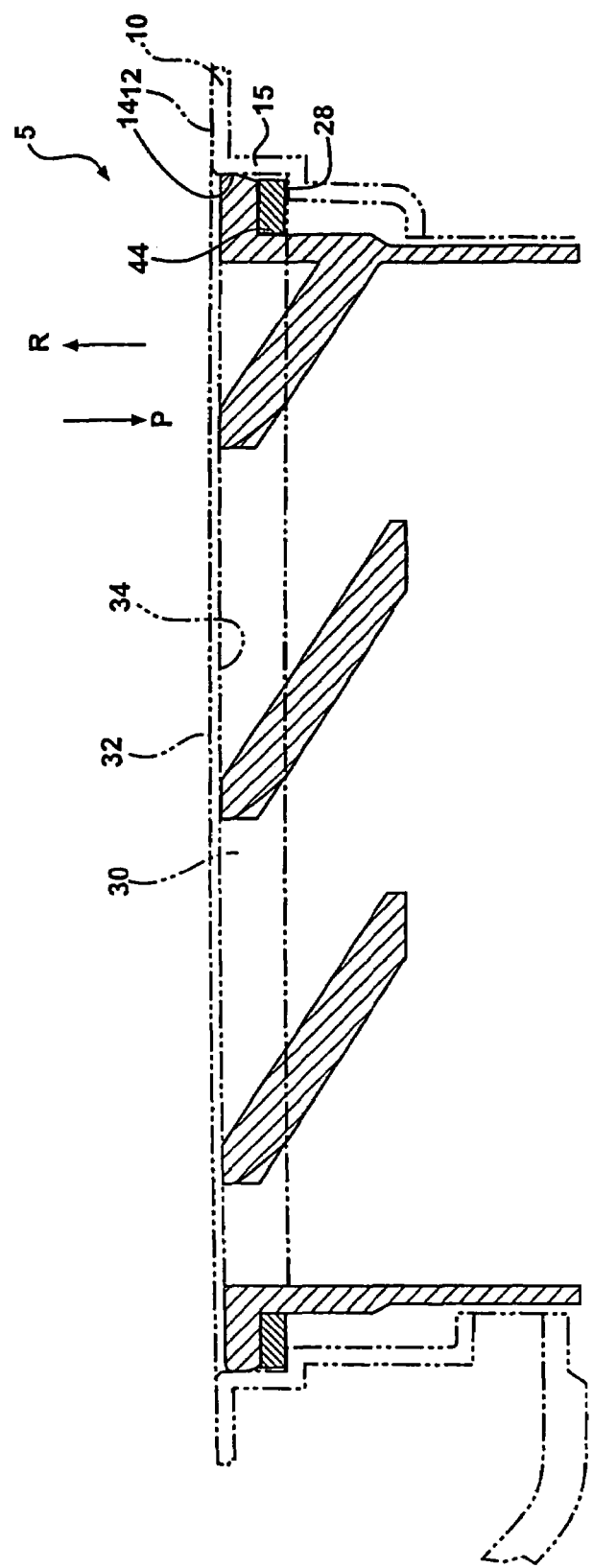
FIG. 2 is a cross sectional view of the instrument panel and panel.

Referring to FIGS. 1 and 2, an instrument panel assembly for an automotive vehicle is generally indicated at 5. The instrument panel assembly includes an instrument panel 10. The instrument panel 10 is a soft panel having a generally rigid structure (not shown) that defines the shape of the instrument panel 10. The rigid structure of the instrument panel 10 is covered by a foam or elastomeric layer, which in turn is trimmed externally in vinyl, leather or the like, as commonly known by those skilled in the art, to define a soft, pliable outer surface 12. An opening 14 is formed in the instrument panel 10 for allowing the installation of or access to components, such as speakers or ventilation conduits. The opening 14 has a perimeter that is generally defined by an inner wall 15. As best shown in FIG. 1, a step 16 protrudes generally inwardly from the inner wall 15. The step 16 defines opposite and spaced apart first 18 and second 20 locking surfaces that are generally normal to an insertion direction P. The first locking surface 18 is generally opposite the outer surface 12. A third locking surface 22 extends from the inner wall 15 to define a distal edge 24. The third locking surface 22 opposes the second locking surface 20 and is spaced between the step 16 and the outer surface 12. A ramp surface 26 extends and provides a transition between the inner wall 16 and the distal edge 24 of the third locking surface 22. As best shown in FIG. 2, an abutment surface 28 is formed in the inner wall 15 of the instrument panel 10 adjacent the opening 14. The abutment surface 28 is generally normal to the insertion direction P and faces the outer surface 12.

A panel 30 is provided for covering the opening 14. Preferably the panel 30 is molded in a molding tool (not shown) out of any suitable moldable material, such as plastic. The panel 30 includes an outer panel surface 32 and an opposite inner panel surface 34. An upstanding wall 35 extends from the inner panel surface 34. The upstanding wall 35 has a smaller perimeter than the inner panel surface 34. A flange 37 adjacent the upstanding wall 35 is defined by the difference in perimeter size between the upstanding wall 35 and the inner panel surface 34.

The panel 30 is adapted for attachment to the instrument panel 10, such that the outer panel surface 32 is generally flush with the outer surface 12 of the instrument panel 10. Specifically, a tab portion 36 extends from the upstanding wall 35. The tab portion 36 includes first 38 and second 40 engaging surfaces. The first 38 and second 40 engaging surfaces are opposing and spaced apart to receive the step 16 therebetween. The first 38 and second 40 engaging surfaces abut the first 18 and second 20 locking surfaces, respectively, during assembly of the panel 30 and the instrument panel 10 to define a dual locking condition, wherein the panel 30 is locked relative to the instrument panel 10 in both the insertion direction P and an opposite removal direction R. The tab portion 36 includes a ramp edge 39 that engages the step 16 during installation of the panel 30 to the instrument panel 10. Engagement between the ramp edge 39 and the step 16 displaces the tab portion 36 inwardly with respect to the inner wall 15 to allow the step 16 to be received between the first 38 and second 40 engaging surfaces.

The panel 30 also includes a locking wall 41 protruding radially outwardly from the upstanding wall 35 and toward the inner wall 15. A third engaging surface 42 is defined by the locking wall 41. The third engaging surface 42 is spaced apart from the inner panel surface 34 for receiving the distal edge 24 therebetween, wherein the third engaging surface 42 is engaged with the third locking surface 22 after assembly of the panel 30 and the instrument panel 10. Engagement between the third engaging 42 and locking 22 surfaces prevents movement of the panel 30 relative to the instrument panel 10 in the removal direction R. During assembly of the panel 30 and the instrument panel 10, the locking wall 41 contacts the ramp surface 26, which inwardly displaces the locking wall 41 relative to the inner wall 15 of the instrument panel 10. Inward displacement of the locking wall 41 relative to the inner wall 15, as the panel 30 is assembled into the opening 14, allows the locking wall 41 to move past the distal edge 24 of the third locking surface 22 until eventually, the third engaging surface 42 engages the third locking surface 22.

Figure 4:
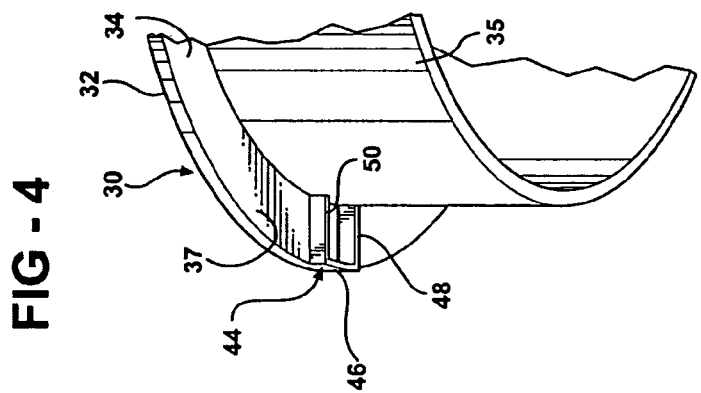
FIG. 4 is a view of a side portion of the panel
Figure 3:
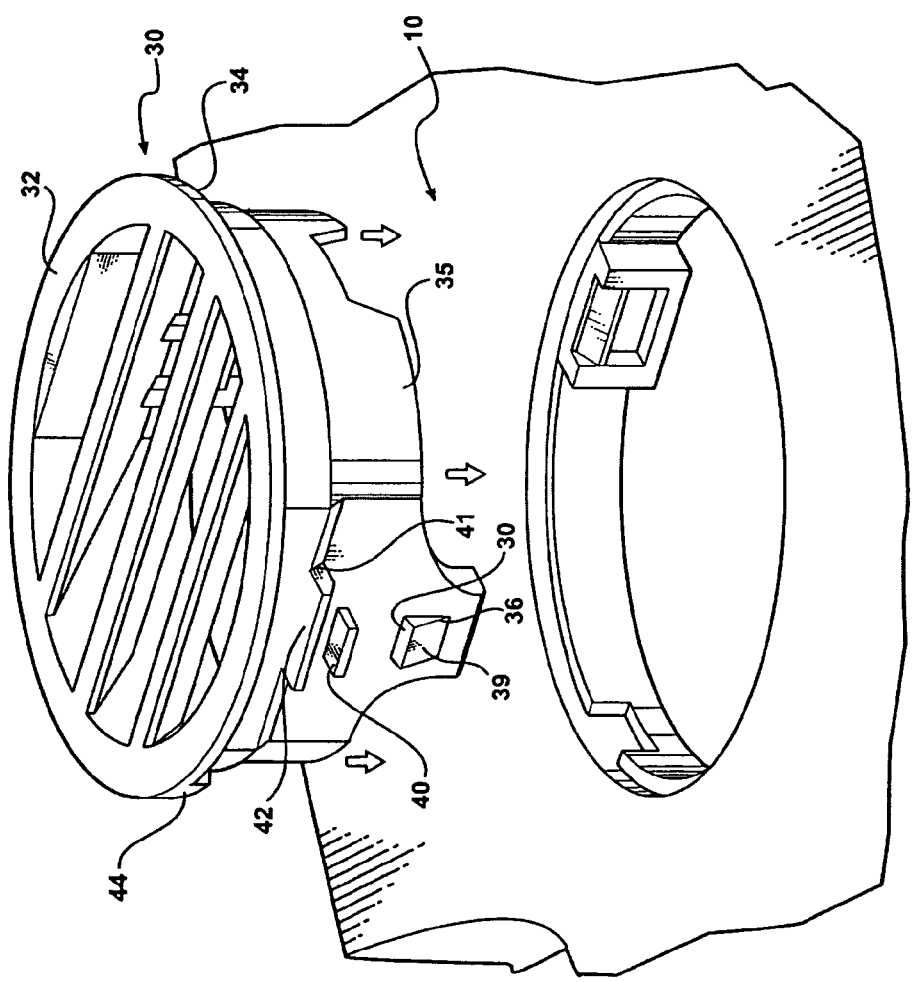
FIG. 3 is a view of the instrument panel assembly prior to assembly

Referring to FIGS. 2 through 4, the panel 30 includes a rib 44 that extends from flange 37 to engage the abutment surface 28. More specifically, the rib 44 includes a main wall 46 that protrudes from the flange 37 and is spaced apart from the upstanding wall 35. Spaced apart first 48 and second 50 supporting walls extend between the main wall 46 and the upstanding wall 35 defining a boxed cross section. Engagement between the rib 44 and the abutment surface 28 prevents movement of the panel 30 relative to the instrument panel 10 in the insertion direction P and maintains the outer panel surface 32 generally flush with the outer surface 12 of the instrument panel 10. The height of the rib 44 relative to the flange 37 can be raised or lowered by making corresponding modifications to the molding tool to accommodate tolerances in the dimensions of the instrument panel 10 and the panel 30, as typically encountered in a production environment.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A panel adapted for attachment to a soft instrument panel of an automotive vehicle, wherein the soft instrument panel includes an outer surface, an opening formed in the outer surface, an inner wall defining a perimeter of the opening, an abutment surface formed in the inner wall spaced apart from the outer surface, and a step extending inwardly from the inner wall, wherein said panel substantially conceals the opening during attachment to the soft instrument panel, said panel comprising:
   an outer panel surface;
   an inner panel surface opposite said outer panel surface;
   at least one rib extending from said inner panel surface for engagement with the abutment surface during attachment of said panel to the soft instrument panel, thereby locating said panel in an insertion direction relative to the instrument panel, wherein said outer panel surface is maintained generally flush with the outer surface of the instrument panel;
   an understanding wall protruding from said inner panel surface; and
   a tab portion extending from said upstanding wall, said tab portion defining opposing first and second engaging surfaces that are spaced apart for receiving the step therebetween, thereby defining a dual locking condition, wherein said panel is locked in both said insertion direction and an opposite removal direction, thereby maintaining said outer panel surface flush with the outer surface of the instrument panel.

2. A panel as set forth in claim 1 including a flange defined in said inner panel surface adjacent said upstanding wall.

3. A panel as set forth in claim 2, wherein said rib protrudes from said flange for engagement with the abutment surface during attachment of said panel to the soft instrument panel, thereby locating said panel in an insertion direction relative to the instrument panel, wherein said outer panel surface is maintained generally flush with the outer surface of the instrument panel.

4. A panel us set forth in claim 3, wherein said rib includes a main wall that protrudes from said flange, said main wall spaced apart from said upstanding wall.

5. A panel as set forth in claim 4 including a first support wall extending between said main wall and said upstanding wall.

6. A panel as set forth in claim 5 including a second support wall extending between said main wall and said upstanding wall.

7. A panel as set forth in claim 6 wherein said second support wall is spaced apart from said first support wall to define a generally boxed cross section with said upstanding wall, said main wall and said first support wall.

8. A panel as set forth in claim 7, wherein said tab portion includes a ramp edge that engages the step during assembly of said panel and the instrument panel to cause displacement of said tab portion relative to the inner wall, thereby allowing the step to be received between said first and second engaging surfaces.

9. A panel as set forth in claim 1, wherein said panel includes a locking wall extending outwardly from said upstanding wall toward the inner wall of the instrument panel to engage a locking surface in the inner wall and, thereby, lock said panel relative to the instrument panel in said removal direction.

10. A panel as set forth in claim 9, wherein said locking wall includes a third engaging surface for engaging the locking surface of the instrument panel to lock said panel relative to the instrument panel in said removal direction.

11. An instrument panel assembly comprising:
   an instrument panel having an outer surface, an opening formed in said outer surface and having a perimeter defined by an inner wall, an abutment surface adjacent to said opening and spaced apart from said outer surface, and a step protruding inwardly from said inner wall to define opposite and spaced apart first and second locking surfaces; and
   a panel having opposite outer and inner panel surfaces, said panel having at least one rib extending from said inner surface for engaging said abutment surface during assembly of said panel and said instrument panel, thereby locating said panel in an insertion direction relative to said instrument panel, wherein said outer panel surface is maintained generally flush with said outer surface of said instrument panel, said panel including a tab portion having first and second engaging surfaces for engaging said first and second locking surfaces to lock said panel relative to said instrument panel in both an insertion direction and an opposite removal direction, respectively, said instrument panel also including a third locking surface extending from said inner wall to define a distal edge.

12. An instrument panel assembly as set forth in claim 11, wherein said tab portion includes a ramp edge that engages said step during assembly of said panel and said instrument panel to cause displacement of said tab portion relative to said inner wall, thereby allowing said step to be received between said first and second engaging surfaces.

13. An instrument panel assembly as set forth in claim 11, wherein said instrument panel includes a ramp surface that provides a transition between said inner wall and said distal edge of said third locking surface.

14. An instrument panel assembly as set forth in claim 13, wherein said panel includes a locking wall that protrudes outwardly toward said inner wall for engaging said ramp surface during assembly of said panel and instrument panel.

15. An instrument panel assembly as set forth in claim 14, wherein said locking wall defines a third engaging surface that engages said third locking surface to prevent movement of said panel relative to said instrument panel in the removal direction.

* * * * *

UNITED STATES PATENT AND TRADEMARK OFFICE
CERTIFICATE OF CORRECTION

| | | |
|---|---|---|
| PATENT NO. | : 7,077,452 B2 | Page 1 of 1 |
| APPLICATION NO. | : 10/987470 | |
| DATED | : July 18, 2006 | |
| INVENTOR(S) | : Andi J. Song | |

It is certified that error appears in the above-identified patent and that said Letters Patent is hereby corrected as shown below:

Column 2, Line 2 -- replace "assembly" with -- assembly; --
Column 2, Line 3 -- replace "panel" with -- panel. --

Signed and Sealed this

Thirteenth Day of February, 2007

JON W. DUDAS
*Director of the United States Patent and Trademark Office*